United States Patent Office 3,445,416
Patented May 20, 1969

3,445,416
PLASTICIZED VINYL CHLORIDE POLYMER
COMPOSITIONS
Albert C. Condo, Newtown Square, Pa., assignor to Atlantic Richfield Company, Philadelphia, Pa., a corporation of Pennsylvania
No Drawing. Filed Sept. 23, 1966, Ser. No. 581,459
Int. Cl. C08f 15/40
U.S. Cl. 260—31.8          10 Claims

ABSTRACT OF THE DISCLOSURE

Thermoplastic compositions having low plasticizer extraction in oil and outstanding low temperature properties comprise a vinyl chloride polymer, a plasticizer for the polymer and a solid thermoplastic graft interpolymer prepared by graft polymerizing either methylmethacrylate or mixtures of methylmethacrylate with another compound having a single vinylidene group copolymerizable therewith onto a butadiene-styrene copolymer having from 50 to 90 weight percent butadiene.

---

This invention relates to plasticized polyvinyl chloride compositions. More particularly, it relates to plasticized polyvinyl chloride compositions having low plasticizer extraction in oil and outstanding low temperature properties.

It is well-known in the art that the addition of acrylate interpolymers to rigid (no plasticizer) vinyl chloride polymers (PVC) will enhance the impact strength, toughness, solvent resistance and other physical properties. For example, United States Patent No. 2,943,074 discloses rigid PVC compositions containing an interpolymer formed by polymerizing an acrylate in the presence of a styrene-butadiene polymer. This composition has improved impact strength and heat distortion properties.

When a plasticized PVC composition (having a plasticizer concentration of greater than 30 parts/100 parts PVC) is placed in an oil environment, an additional problem arises which is not encountered in rigid compositions. If the oil is a solvent for the plasticizer, the plasticizer will migrate through the composition and dissolve in the oil. Thus, after continual contact in this environment, the extraction causes the composition to become brittle. It has now been discovered, however, that the addition of the aforementioned interpolymer to a plasticized PVC composition greatly reduces the rate of plasticizer extraction in an oil environment and imparts outstanding low temperature properties to the composition.

Therefore, it is an object of this invention to provide plasticized polyvinyl chloride compositions which have both outstanding low temperature properties and a low plasticizer extraction rate in an oil environment. When prepared as a film or sheet, these compositions can be used to package motor oil.

In general, the composition of this invention comprises in parts by weight (a) 100 parts of polymeric material which contains
  (1) from 40 to 80 parts of a vinyl chloride polymer containing at least 50 percent by weight vinyl chloride, and
  (2) from 20 to 60 parts of a solid thermoplastic interpolymer containing
    (i) from 85 to 25 parts of a compound selected from the group consisting of methyl methacrylate and mixtures of at least 55 percent by weight methyl methacrylate with another compound having a single vinylidene group copolymerizable therewith, and
    (ii) 15 to 75 parts of a copolymer containing from 90 to 50 weight percent butadiene and from 10 to 50 weight percent styrene and
(b) from 30 to 120 parts of a compound which is a plasticizer for the polyvinyl chloride polymer.

The acrylate interpolymers which can be utilized in this invention are solid thermoplastic interpolymers prepared by polymerizing an acrylate monomer in the presence of a styrene/butadiene copolymer. The acrylate monomer can be methyl methacrylate or a mixture containing at least 55 percent by weight methyl methacrylate and the remainder comprising another monomer which copolymerizes with methyl methacrylate. For example, the co-monomer can be acrylonitrile, ethyl acrylate, vinylidene chloride, styrene or other compounds containing a single vinylidene group. Preferably, the acrylate monomer is comprised solely of methyl methacrylate. The second component of the interpolymer is a styrene/butadiene copolymer containing from 10 to 50 weight percent styrene and from 50 to 90 weight percent butadiene. Preferably, the styrene content ranges from 25 to 40 weight percent.

With respect to the relative amounts of acrylate monomer and styrene/butadiene copolymer in the interpolymer, the acrylate can comprise from 25 to 85 parts and the copolymer from 15 to 75 parts per 100 parts interpolymer. Preferably, the acrylate concentration ranges from 40 to 70 parts and correspondingly, the copolymer concentration ranges from 30 to 60 parts per 100 parts interpolymer.

The interpolymers have been described in U.S. Patent No. 2,943,074 and can be prepared by a method set forth in U.S. Patent No. 2,857,360. Both patents are hereby incorporated by reference into this specification. Essentially, the interpolymer is prepared by adding the acrylate monomer to a latex containing a styrene-butadiene copolymer having a molecular weight in the range of 25,000 to 1,500,000. The polymerization is conducted in the latex medium in the presence of a catalyst and emulsifying agent. After substantially all of the monomer has been converted to polymer, coagulation is initiated and the solid interpolymer recovered, washed and dried.

The vinyl chloride polymer can be any solid suspension or plastisol grade resin and can be comprised solely of vinyl chloride or can contain up to 50 percent by weight of another monomer containing a monoolefinic group. Examples of co-monomers include but are not limited to methyl methacrylate, acrylonitrile, styrene, ethylene, and so forth. Preferably, the polymer is a vinyl chloride homopolymer.

The basic unit of measurement used throughout this specification and claims is 100 parts of polymeric material. This polymeric material is composed of both the vinyl chloride polymers and the interpolymer. Based on 100 parts by weight of polymeric material from 20 to 60 parts of the solid thermoplastic interpolymer can be combined with from 40 to 80 parts of vinyl chloride polymer. Preferably, the concentration of interpolymer ranges from 25 to 50 parts per 100 parts polymeric material.

The third component necessary in the composition of this invention is a plasticizer for the PVC polymer. This plasticizer can be monomeric or polymeric. Such compounds are well-known in the art and include but are not limited to monomeric plasticizers such as the phthalates including dioctyl phthalate, diisoctylphthalate, dibutyl phthalate; the phosphates such as tritolyl phosphate and trioctyl phosphate; sebacates such as dibutyl sebacate, diisoctyl sebacate or dioctyl sebacate; the adipates including dibutyl adipate, didecyl adipate; the azelates such as dioctyl azelate and polymeric plasticizers such as epoxidized oils and esters including epoxidized soy bean and vegetable oils; polyesters such as those formed by combining a polyol with a dibasic fatty acid; petroleum derivatives; chlorinated paraffin wax; and polypropylene adipate. In order to constitute a plasticized polyvinyl chloride composition the plasticizer must be present in amounts greater than 30 parts by weight per 100 parts polymeric material. The upper limit in plasticizer concentration is determined by the specific properties desired in the final composition. The higher the plasticizer loading the more flexible the composition. Normally, loadings up to about 120 parts per 100 parts polymeric material can be utilized. Preferably, plasticizer concentration ranges from 40 to 80 parts by weight per 100 parts polymeric material.

In accordance with our invention the addition of the solid thermoplastic interpolymer and plasticizer to the vinyl chloride polymers can be accomplished in any manner so long as a thorough distribution of the two additives in the polymer is obtained. For example, the mixing of the materials can be accomplished by any one of the variety of methods normally employed for the incorporation of plasticizers or fillers into thermoplastic polymers, including, but not limited to, mixing rolls, doughmixers, Banbury mixers, blenders and other mixing equipment. The resulting mixtures can be handled in any conventional manner employed for the fabrication or manipulation of thermoplastic resins. The materials can be formed or molded using compression, injection, calendering and extrusion techniques.

It should be understood that the vinyl chloride polymer mixtures prepared in accordance with this invention can also contain, in addition to the solid thermoplastic interpolymer and plasticizers, other additives to lubricate, prevent degradation, or lend color to the material. Common examples of these additives include heat stabilizers, pigments, fillers, ultraviolet light stabilizers, impact improvers, secondary plasticizers, lubricants and antioxidants. These additives are well-known in the art, and can be incorporated in the compositions in functional amounts without departing from the scope of the invention.

The following examples are given in order to demonstrate specific embodiments of this invention and should not be construed as limitations on the scope of the invention.

EXAMPLE I

This example demonstrates the effect of the interpolymer in plasticized polyvinyl chloride compositions.

The polyvinyl chloride, plasticizer and interpolymer were blended in a Hobart mixer in accordance with the amounts set forth in Table I. 2.5 parts of a heat stabilizer (a barium/cadmium organic soap), .5 part of an antioxidant (a liquid phosphite) and .4 part of a lubricant (stearic acid) were also added to each blend in the mixer. The blend was then milled at 300° F. for approximately 5 minutes until a homogeneous composition was obtained. The stock was withdrawn from the mill as a 10 mil sheet. The brittleness temperature and oil extraction resistance were then measured. The results are set forth in Table I.

TABLE I

| Formulation No. | 1 | 2 | 3 | 4 | 5 | 6 | 7 | 8 | 9 |
|---|---|---|---|---|---|---|---|---|---|
| Polyvinyl chloride [1] | 100 | 75 | 100 | 85 | 75 | 70 | 60 | 100 | 75 |
| Plasticizer [2] | 40 | 40 | 50 | 50 | 50 | 50 | 50 | 60 | 60 |
| Interpolymer [3] | 0 | 25 | 0 | 15 | 25 | 30 | 40 | 0 | 25 |
| Brittleness temperature, °F. [4] | +34 | +5 | +26 | +23 | +2 | −8 | −15 | +17 | 0 |
| Oil extraction, [5] percent weight loss | 1.27 | 1.00 | 2.31 | 2.61 | 1.45 | 1.05 | .06 | 3.34 | 1.88 |

[1] A suspension grade polyvinyl chloride homopolymer having an average molecular weight of 100,000, a number average molecular weight of 50,000 and a particle size 100 percent thru 40 mesh.
[2] A condensation polymer of adipic acid and 1,3-butylene glycol terminated with palmitic acid; molecular weight ~3500; viscosity at 25° C.-50 poises; refractive index at 25° C.-1.466; saponification number—500 mg. KOH/gram; specific gravity—1.08.
[3] An interpolymer formed by polymerizing methyl methacrylate in the presence of a styrene/butadiene copolymer according to the method set forth in U.S. Patent No. 2,857,360. The interpolymer contained 57 percent by weight poly(methyl methacrylate) and 43 percent of a styrene/butadiene copolymer containing 30 percent styrene.
[4] ASTM Number D-746.
[5] Percent weight loss or a 10 mil. sheet after immersion in mineral oil at 50° C. for 24 hours.

It can be seen from the results in Table I that the oil extraction of plasticizer in polyvinyl chloride compositions can be substantially reduced by the incorporation greater than 20 parts of interpolymer. It is also shown that when the interpolymer loading is about 40 parts, the plasticizer extraction is reduced approximately 95 percent. Furthermore, the incorporation of interpolymer greatly reduces the brittleness temperature.

EXAMPLE II

This example demonstrates the effect of incorporating the interpolymer into polyvinyl chloride compositions containing various plasticizers.

The polyvinyl chloride compositions were prepared in accordance with the procedure set forth in Example I. The amounts of the various components are set forth in Table II. The heat stabilizer, antioxidant, and lubricant were added in accordance with the amounts set forth in Table I. The brittleness temperatures and oil extraction rate are given in Table II.

TABLE II

| Formulation No. | 10 | 11 | 12 | 13 | 14 | 15 |
|---|---|---|---|---|---|---|
| Polyvinyl chloride [1] | 100 | 75 | 100 | 75 | 100 | 75 |
| Interpolymer [3] | 0 | 25 | 0 | 25 | 0 | 25 |
| Plasticizer: | | | | | | |
|   Di-2-ethyl hexyl phthalate | 60 | 60 | | | | |
|   Isobutyrate [6] | | | 60 | 60 | | |
|   Acrylonitrile-butadiene copolymer [7] | | | | | 60 | 60 |
| Brittleness temperature, °F. | −20 | −43 | 26 | 6 | −25 | −54 |
| Oil Extraction, [5] percent weight loss | 12.6 | 9.5 | 0.65 | 0.04 | 3.9 | 1.6 |

[1], [3], [4] and [5] as defined in Table I.
[6] 2,24-trimethyl-1,3-pentanediol diisobutyrate having a molecular weight of 286, a refractive index at 25° C. of 1.4300 and a saponification equivalent of 144.8.
[7] A liquid acrylonitrile-butadiene copolymer containing 33 percent acrylonitrile; and having a specific gravity of 0.98.

I claim:
1. A thermoplastic composition comprising in parts by weight:
(a) 100 parts of polymeric material which contains

(1) from 40 to 80 parts of a vinyl chloride polymer containing at least 50 percent by weight vinyl chloride, and (2) from 20 to 60 parts of a solid thermoplastic graft interpolymer containing
   (i) from 85 to 25 parts of a monomer selected from the group consisting of methyl methacrylate and mixtures of at least 55 percent by weight methyl methacrylate with another compound having a single vinylidene group copolymerizable therewith, and grafted on to
   (ii) 15 to 75 parts of a copolymer containing from 90 to 50 weight percent butadiene and from 10 to 50 weight percent styrene, and (b) from 30 to 120 parts of a compound which is a plasticizer for the polyvinyl chloride polymer.

2. A composition according to claim 1 wherein the vinyl chloride polymer is a homopolymer.

3. A composition according to claim 1 wherein the interpolymer is present in an amount ranging from 25 to 50 parts per 100 parts of polymeric material (a).

4. A composition according to claim 1 wherein the interpolymer contains from 40 to 70 parts methyl methacrylate and from 30 to 60 parts of butadiene/styrene copolymer.

5. A composition according to claim 1 wherein the styrene concentration of the copolymer ranges from 25 to 40 percent.

6. A composition according to claim 1 wherein the plasticizer concentration ranges from 40 to 80 parts.

7. A composition according to claim 1 comprising
(a) 100 parts of a polymeric material containing
   (1) from 60 to 75 parts of a polyvinyl chloride homopolymer
   (2) from 25 to 40 parts of a solid thermoplastic graft interpolymer containing
      (i) from 40 to 70 parts of methyl methacrylate grafted on to
      (ii) from 30 to 60 parts of a styrene/butadiene copolymer containing from 25 to 40 percent styrene, and
(b) from 40 to 60 parts of a plasticizer for the polyvinyl chloride.

8. A composition according to claim 1 wherein the plasticizer is selected from the group consisting of dioctyl phthalate, dioctyl sebacate, dioctyl adipate and a polyester formed by combining 1,3-butylene glycol and adipic acid.

9. A composition according to claim 1 wherein the plasticizer is a polyester formed by combining 1,3-butylene glycol and adipic acid.

10. A composition according to claim 1 wherein the plasticizer is dioctyl phthalate.

References Cited

UNITED STATES PATENTS 2,943,074    6/1960    Feuer _____ 260—876
3,015,640    1/1962    Weaver et al.

MORRIS LIEBERMAN, *Primary Examiner.*

L. T. JACOBS, *Assistant Examiner.*

U.S. Cl. X.R.

260—876